United States Patent [19]

Hattori et al.

[11] Patent Number: 4,466,405

[45] Date of Patent: Aug. 21, 1984

[54] FEEDBACK TYPE IGNITION TIMING CONTROL SYSTEM FOR INTERNAL COMBUSTION ENGINES

[75] Inventors: Tadashi Hattori, Okazaki; Hiroaki Yamaguchi, Anjo; Yoshinori Ootsuka, Okazaki; Kenji Goto; Daisaku Sawada, both of Susono, all of Japan

[73] Assignees: Nippon Soken, Inc., Nishio; Toyota Jidosha Kogyo Kabushiki Kaisha, Toyota, both of Japan

[21] Appl. No.: 375,668

[22] Filed: May 6, 1982

Related U.S. Application Data

[62] Division of Ser. No. 097,663, Nov. 27, 1979, Pat. No. 4,328,779.

[30] Foreign Application Priority Data

Dec. 7, 1978 [JP] Japan ................................. 53-152334

[51] Int. Cl.³ ............................................... F02P 5/12
[52] U.S. Cl. ..................................... 123/416; 123/425
[58] Field of Search ............... 123/416, 417, 425, 435, 123/480, 486

[56] References Cited

U.S. PATENT DOCUMENTS

| 4,002,155 | 1/1977 | Harned et al. | 123/425 |
|---|---|---|---|
| 4,190,027 | 2/1980 | Inui et al. | 123/416 |
| 4,200,064 | 4/1980 | Engele | 123/480 |
| 4,201,161 | 5/1980 | Sasayama et al. | 123/416 |
| 4,211,194 | 7/1980 | Hattori et al. | 123/425 |
| 4,243,007 | 1/1981 | Ehrhardt et al. | 123/416 |
| 4,244,339 | 1/1981 | Gorille | 123/416 |

Primary Examiner—Andrew M. Dolinar
Attorney, Agent, or Firm—Cushman, Darby & Cushman

[57] ABSTRACT

In a feedback type ignition timing control system for internal combustion engines, the predetermined correction advance/retard angle values are stored in a read/write memory at the respective storage areas defined by the respective operating conditions of an engine, and the correction advance/retard angle values are each separately rewritten in accordance with the detected associated engine condition in response to a signal detecting the feedback factor. The advance/retard angle value for the ignition timing corresponding to the detected engine condition is separately determined in accordance with the corresponding rewritten advance/retard angle value and the ignition timing is controlled to suit the respective engine conditions in accordance with the correction advance/retard angle values preliminarily rewritten in response to the feedback factor.

8 Claims, 8 Drawing Figures

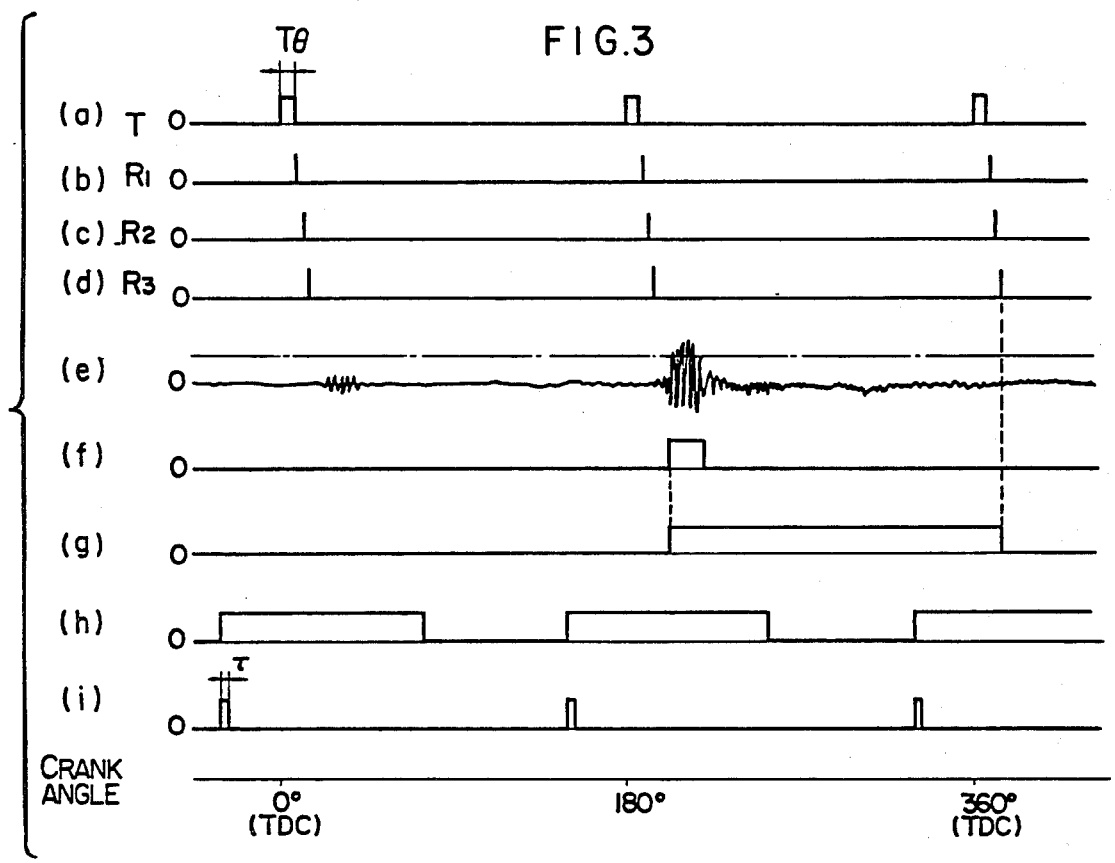
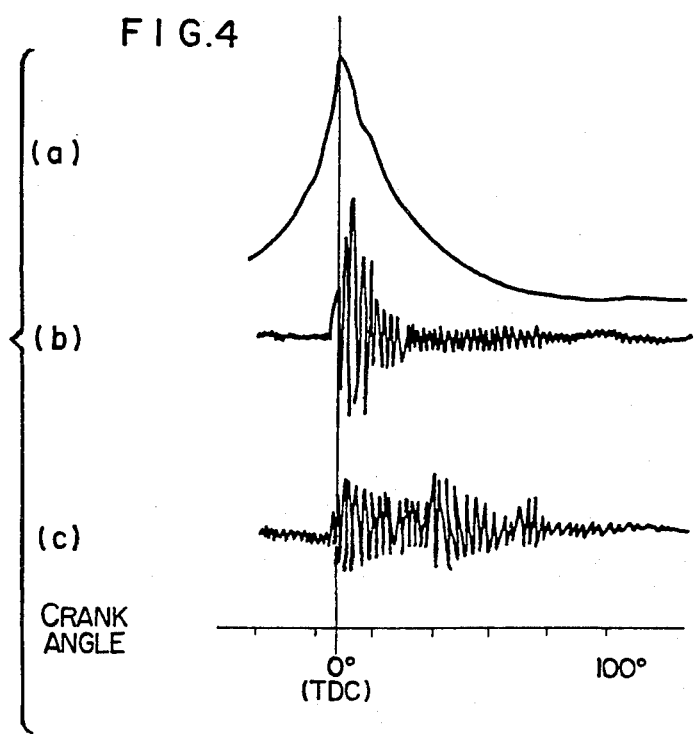

FEEDBACK TYPE IGNITION TIMING CONTROL SYSTEM FOR INTERNAL COMBUSTION ENGINES

This is a division of application Ser. No. 97,663 filed Nov. 27, 1979 now U.S. Pat. No. 4,328,779.

BACKGROUND OF THE INVENTION

This invention relates to a feedback type ignition timing control system for internal combustion engines which advances or retards the ignition timing in response to a signal corresponding to the torque or combustion phenomenon such as knocking phenomenon of an engine.

The ignition timing of an engine must be controlled according to the engine conditions so as to ensure the optimum operation of the engine.

Ignition timing control systems known in the art are generally so designed that the rotational speed and intake vacuum of an engine are detected to represent the condition of the engine and the ignition timing is controlled in accordance with the detected engine condition.

It is known in the art that in consideration of the efficiency and fuel consumption of an engine, the best way is to effect the ignition at around a so-called MBT (the minimum advance for best torque) and the ignition timing must be adjusted to MBT in accordance with the engine conditions.

However, this MBT is affected not only by the above-mentioned factors, i.e., the engine speed and load but also by such factors as the supplied air-fuel mixture ratio, the amount of exhaust gas recirculation (EGR), the engine temperature and the atmospheric condition and consequently it is extremely difficult to effect the ignition at MBT under all the operating conditions of the engine. Further, under certain engine operating conditions knock will be produced later than MBT and it is necessary to prevent the occurrence of knock. As a result, in the case of the known systems the ignition timing is set considerably after MBT so as to prevent knocking. This restrains the power output and fuel consumption of an engine below its performance. With a view to overcoming these deficiencies, feedback type ignition timing control systems have been proposed in which is detected the acceleration, speed or the like associated with the pressure in the combustion chamber of an engine or the engine vibration produced externally by such pressure factor, whereby the torque is calculated or the detection of knocking phenomenon is effected and feedback is applied to control the ignition timing in accordance with the detection signal so as to advance or retard the ignition timing. In this type of feedback system, generally the operation of addition or subtraction is performed on a base advance angle value $\theta_M$ and a feedback correction value $\theta_K$ and the resulting $\theta_M + \theta_K$ or $\theta_M - \theta_K$ is utilized to control the ignition timing. In this case, the usual method of determining the base advance angle value $\theta_M$ is to compute the same in accordance with such main engine parameters as the amount of air flow, rotational speed and intake pressure as well as such compensating parameters as warm-up condition, amount of EGR and acceleration/deceleration operation or to read out the value from a preliminarily programmed fixed map. On the other hand, irrespective of the main engine parameters, the feedback correction value $\theta_K$ is produced only from the output signal of a feedback factor detector for detecting a knocking phenomenon, combustion pressure or the like and it is used to correct the value $\theta_M$ so as to generally shift the same and thereby to effect the ignition.

However, this type of known system has the following disadvantages. Firstly, due to a fairly wide range of differences in the combustion of an engine, if the correction value is computed statistically on the basis of the data obtained through the ignition cycles ranging from several tens to several hundreds so as to reduce the differences in combustion, under transient conditions a delay will be caused in the system's response and the follow-up or response quality will be deteriorated.

Another disadvantage is that if the correction value $\theta_K$ is computed for every ignition cycle instead of computing it through a statistical procedure, the range of hunting will be increased extremely by the variations in combustion so that the combustion will be varied greatly and thus the torque will be varied, giving rise to a detrimental effect on the drivability. If the amount of correction for each ignition cycle is reduced so as to reduce the range of hunting, the delay in response will be increased as is the case when the correction value is computed statistically.

SUMMARY OF THE INVENTION

With a view to overcoming the foregoing deficiencies in the prior art, it is the object of the invention to provide an improved feedback type ignition timing control system in which noting the fact that a feedback factor does not change abruptly but changes gradually depending on the warming-up, the atmosphere, the combustion chamber deposit and the gasoline composition, the correction advance/retard angle values corresponding to the respective engine operating conditions are stored in a read/write memory and the correction advance/retard angle values are each separately rewritten according to the detected associated engine operating condition in response to a signal detecting the feedback factor. The advance/retard angle value for the ignition timing corresponding to the detected engine operating condition is separately determined in accordance with the rewritten advance/retard angle value, thereby making it possible to satisfactorily control the ignition timing to suit the respective engine operating conditions in accordance with the correction advance/retard angle values rewritten previously in response to the feedback factor.

BRIEF DESCRIPTION OF THE DRAWINGS

FIG. 3 is a waveform diagram useful in explaining the operation of the embodiment shown in FIG. 1.

FIG. 4 is a waveform diagram showing the knocking conditions in the ordinary engine.

DESCRIPTION OF THE PREFERRED EMBODIMENTS

The present invention will now be described in greater detail with reference to the illustrated embodiments.

Figure 1:
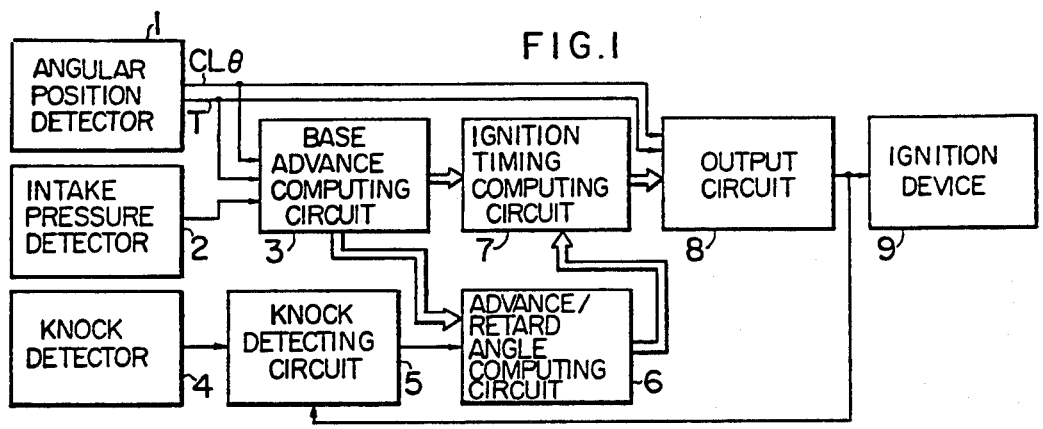
FIG. 1 is a block diagram showing a first embodiment of a feedback type ignition timing control system according to the invention.

Referring to FIG. 1 illustrating a block diagram for a first embodiment of the invention used for knock feedback control purposes, numeral 1 designates an angular position detector mounted on the distributor shaft of a four-cylinder four-cycle internal combustion engine to generate for every shaft rotation four reference signals T of a predetermined angular width $T\theta$ and to generate angular pulses $CL\theta$ equispaced for one revolution of the engine, 2 an intake pressure detector for electrically detecting the intake pressure of the engine, and 3 a base advance computing circuit connected to the angular position detector 1 and the intake pressure detector 2 to determine a base advance value $\theta_M$ in accordance with the engine condition (the engine speed N and the intake pressure P). The angular position detector 1, the intake pressure detector 2 and the base advance computing circuit 3 perform the computation of a predetermined fixed base advance in accordance with the engine condition. Numeral 4 designates a knock detector of the piezoelectric element type (piezoelectric element), generator type (magnet, coil) or the like which detects the vibration in the body of an engine associated with its knocking phenomenon or the sound wave produced by the engine vibration, and 5 a knock detecting circuit responsive to the output signal of the knock detector 4 to detect the presence of knock. Numeral 6 designates an advance/retard angle computing circuit connected to the knock detecting circuit 5 whereby when knock occurs the data of the advance/retard angle $\theta_K$ corresponding to the detected engine condition is rewritten, and 7 an ignition timing computing circuit connected to the base advance computing circuit 3 and the advance/retard angle computing circuit 6 to compute an advance angle $\theta$ from the base advance $\theta_M$ and the advance/retard angle $\theta_K$ and thereby to determined to proper ignition timing, and the advance/retard angle computing circuit 6 and the ignition timing computing circuit 7 form an ignition advance/retard angle computing circuit for determining the proper ignition timing. Numeral 8 designates an output circuit connected to the angular position detector 1 and the ignition timing computing circuit 7 to control the primary winding of the ignition coil and thereby to effect the ignition with the ignition timing determined by the ignition timing computing circuit 7, and 9 a known type of ignition device connected to the output circuit 8 so as to effect the ignition upon interruption of the primary current in the ignition coil.

Figure 2:
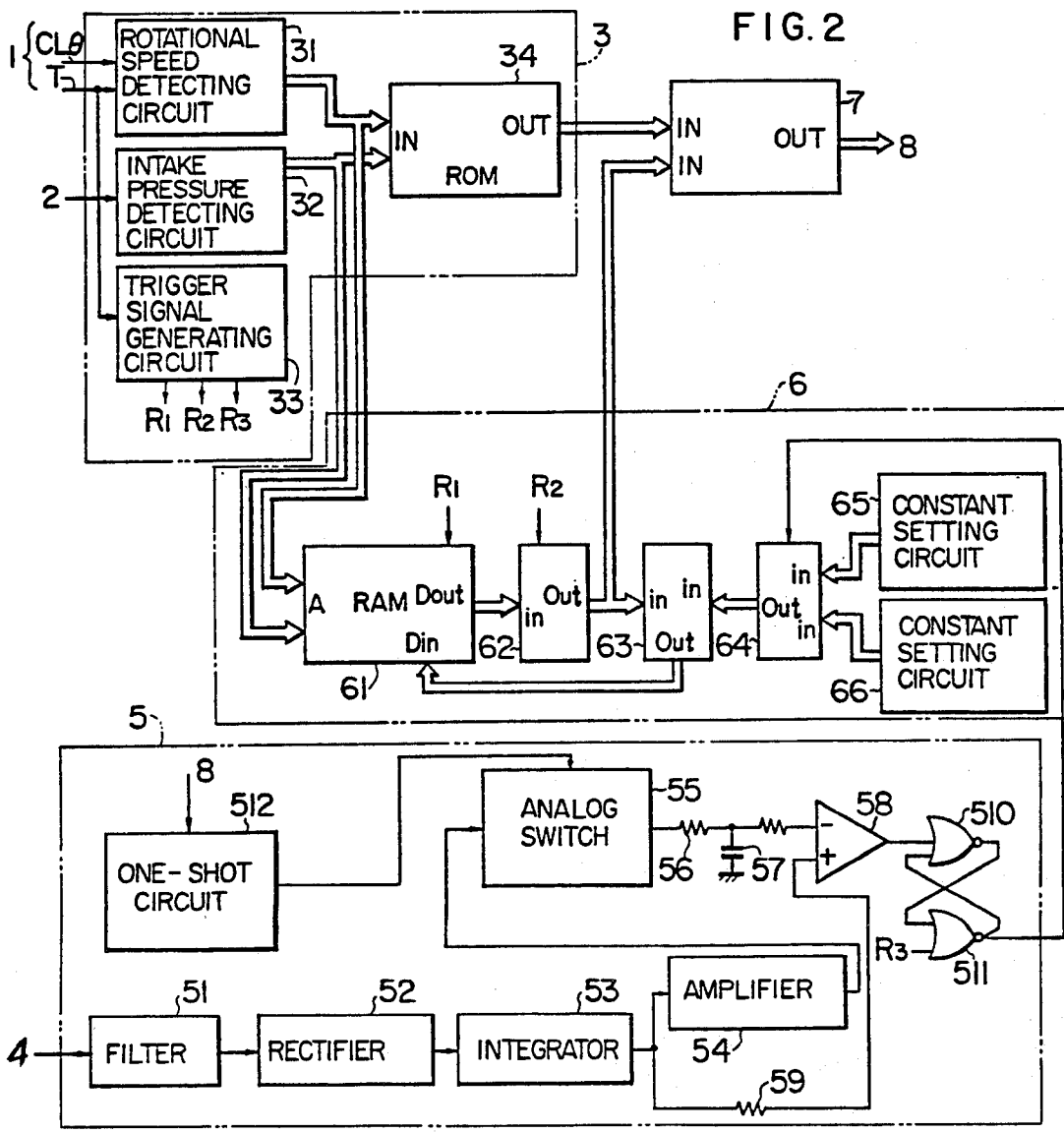
FIG. 2 is a circuit diagram showing in detail the principal component parts of the embodiment shown in FIG. 1.

The circuit construction of the principal parts of this embodiment will now be described in detail. Referring first to FIG. 2, the base advance computing circuit 3 comprises a rotational speed detecting circuit 31 connected to the angular position detector 1 for measuring the time interval of the predetermined angular width $T\theta$ of a reference signal generated for every half revolution of the engine so as to generate a digital signal indicative of the rotational speed N of the engine, an intake pressure detecting circuit 32 connected to the intake pressure detector 2 to generate a digital signal indicative of the engine intake pressure, a trigger signal generating circuit 33 connected to the angular position detector 1 whereby in response to the negative-going transition of the reference signal T generated at the top dead center (TDC) trigger pulses $R_1$, $R_2$ and $R_3$ are sequentially generated as shown in FIG. 3, and a read-only memory 34 (hereinafter referred to as an ROM) connected to the rotational speed detecting circuit 31 and the intake pressure detecting circuit 32 and having the desired base advance angles $\theta_M$ corresponding to the engine speeds N and the intake pressures P stored in the storage areas defined by the respective engine operating conditions. The time interval between the negative transition of the reference signal T and the time that the trigger pulse $R_3$ is generated, is selected sufficiently shorter than the period with which the angular pulses $CL\theta$ are generated. The knock detecting circuit 5 comprises a bandpass filter 51 for passing the output of the knock detector 4 corresponding to a predetermined knock frequency band (a frequency band of 7 to 10 kHz in this embodiment), a rectifier circuit 52 for full-wave or half-wave rectifying the waveform passed through the bandpass filter 51, an integrator 53 for integrating and averaging the output of the rectifier circuit 52, an amplifier 54 for amplifying K times the output signal of the integrator 53, an analog switch 55, a hold circuit comprising a resistor 56 and a capacitor 57, a comparator circuit 58 for comparing the output of the hold circuit with the output of the integrator 53 applied through a resistor 59, NOR circuits 510 and 511, and a one-shot circuit 512 connected to the output circuit 8 to generate after each ignition a pulse of a predetermined time width $\tau$ as shown in (i) of FIG. 3. The advance/retard angle computing circuit 6 comprises a read/write memory device 61 (hereinafter referred to as an RAM) and having preliminarily stored therein the advance/retard angles $\theta_K$ corresponding to the engine operating conditions, a memory 62 (hereinafter referred to as a latch) connected to the data output of the RAM 61 to store its digital output, a constant setting circuit 65 for digitally setting the 2's complement of a constant i, a constant setting circuit 66 having a constant j digitally set therein, a selector circuit 64 responsive to the output of the knock detecting circuit 5 to select one or the other of the constants set by the constant setting circuits 65 and 66, and an adder circuit 63 for adding the digital outputs of the latch 62 and the selector circuit 64.

Figure 5:
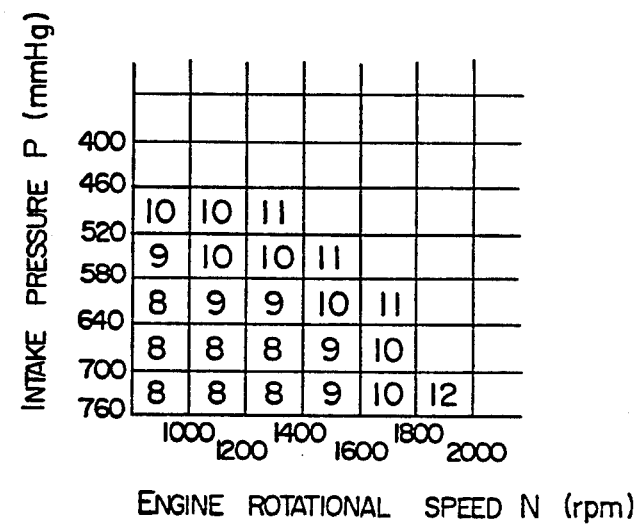
FIG. 5 is a programmed condition diagram for the embodiment shown in FIG. 1.

Next, the ROM 34 and the RAM 61 constituting the essential parts of the invention will be described. The ROM 34 and the RAM 61 for programming the base advance angles $\theta_M$ and the correction values $\theta_K$ have the same construction and dividing points with respect to the respective engine conditions N, P and their respective storage areas contain the values $\theta_M(Ni, Pi)$ and $\theta_K(Ni, Pi)$ corresponding to the respective engine conditions (Ni, Pi). FIG. 5 shows this programming method and the figures indicate the advance angles $\theta_M$, $\theta_K$ which are programmed in the form of a map according to the predetermined dividing points for the engine speeds N and the intake pressures P (e.g., in steps of 200 rpm and 60 mmHg, respectively). The base advance angles $\theta_M$ with which the engine is operable (e.g., the MBT values, the minimum fail-safe advance angles or the predetermined values) are preliminarily programmed permanently. As regards the correction values $\theta_K$, at the initial condition the predetermined numerical values (e.g., the values which are all zero or calculated values) are stored and the stored values are respectively modified in accordance with the operation of the engine in response to the MBT or knock condition. The correction value $\theta_K$ is varied in accordance with the operation of the engine and eventually an MBT characteristic is provided which prevents the occurrence of knock. In this case, the RAM map for $\theta_K$ can store either the positive values or the negative values (in the form of 2's complements). If the base advance values $\theta_M$ are in the form of MBT values only the knocking angles will be corrected to a large extent, and if the values $\theta_M$ are in the form of fail-safe values the amount of correction of $\theta_K$ will be increased (there will be a shift as a whole). Anyway, no matter whichever is programmed, the ignition timing will be eventually corrected to the same advance angle $\theta_M + \theta_K$. The finer the division of the programmed values, more satisfactory will be the accuracy of control but with the corresponding increase in the capacity of the ROM 34 and the RAM 61. In such a case, if the programmed points are interconnected with a straight line and the interpolation is used, the capacity of the ROM 34 and the RAM 61 will be decreased. For example, in the previously mentioned case, with the intake pressure P being in the range of 760 to 700 mmHg, it is only necessary to select A=8° for N=1200 rpm and A=10° for N=1800 rpm and perform the operation $$\text{of } A = \frac{10-8}{1800-1200} \times \Delta N + 8,$$

where $\Delta N$ is the detected rotational speed $N_x - 1200$. The RAM 61 may be comprised of a non-volatile memory, a memory equipped with a back-up battery so as to prevent erasure of the data upon disconnection of the power source or a volatile memory adapted to store zeros or predetermined values such as 5° crank angle at the start of the engine. The ignition timing computing circuit 7 comprises an adder.

The operation of the above-described embodiment will now be described with reference to the waveform diagram of FIG. 3 in which the abscissa represents the crank angle. The angular position detector 1 is designed so that from the top dead center (TDC) of the respective cylinders two reference signals T each having a predetermined angular width $T\theta$ as shown in (a) of FIG. 3 and angular signals $CL\theta$ each corresponding to a predetermined crank angle (1° crank angle) are generated for every crankshaft revolution. In the trigger signal generating circuit 33 of the base advance computing circuit 3, trigger pulses $R_1$, $R_2$ and $R_3$ are sequentially generated in response to the negative-going transition of the reference signal T as shown in (b), (c) and (d) of FIG. 3. The rotational speed detecting circuit 31 measures the time duration of the predetermined angular width $T\theta$ and detects the then current rotational speed N. The intake pressure detector 2 generates and applies an analog signal to the intake pressure detecting circuit 32 which in turn subjects the intake pressure P to A-D conversion. Assuming that (Ni, Pi) represents the data of the rotational speed N and the intake pressure P, this data (Ni, Pi) is applied to the ROM 34 and the base advance angle $\theta_M$ corresponding to the condition (Ni, Pi) or base advance angle $\theta_{Mi}$ is read out and it is applied to the ignition timing computing circuit 7. In the description to follow, the operation of the embodiment will be explained with reference to a case in which the base advance angles $\theta_M$ are in the form of minimum fail-safe advance angles.

On the other hand, the detection of knock is accomplished in the following way. Referring to the waveform diagram of FIG. 4, (a) shows the combustion pressure in the cylinder, (b) the knocking high frequency signal derived from the pressure signal and (c) the knock signal detected by a vibration sensor or the like. Knock is caused as the combustion proceeds and the knock occurs at such point that the knock begins after TDC (15° after TDC and on in the illustration) and the duration of high frequency generation increases in both directions with increase in the intensity of the knock. On the other hand, during the time interval between the ignition point and TDC having the least knocking tendency, the knock detector 4 generates a noise signal because of the engine vibration or the like. As a result, in accordance with the present embodiment the knock is detected in accordance with the ratio of the base noise produced during the non-knocking period just after the ignition to the actual knock so as to improve the detecting accuracy. More specifically, the output signal of the knock detector 4 shown in (e) of FIG. 3 is applied to the knock detecting circuit 5 so that the averaged voltage value of the base vibration waveform produced during a predetermined non-knocking period $\tau$ after the ignition is increased K times and then held in the capacitor 57 and the thus held value is compared with the output value of the integrator 53. When there is no knock, the held value is always greater than the integrator output value, whereas when knock occurs the output value of the integrator 53 exceeds the held value after around TDC so that the output of the comparator circuit 58 goes to "1" and a knock pulse is generated as shown in (f) of FIG. 3. Consequently, the flip-flop comprising the NOR circuits 510 and 511 generates at its output a pulse which goes to "1" in response to the generation of the knock pulse and which goes to "0" in response to the trigger pulse $R_3$ as shown in (g) of FIG. 3. The output of the flip-flop is applied to the selector circuit 64 of the advance/retard angle computing circuit 6, so that when the flip-flop output is at the "1" level, the selector circuit 64 generates the 2's complement of the constant i set by the constant setting circuit 65, whereas when the flip-flop output is at the "0" level the constant j set by the constant setting circuit 66 is generated from the selector circuit 64. Each of the constants i and j represents a predetermined advance/retard angle. On the other hand, the advance/retard angle corresponding to the engine condition (Ni, Pi) and determined by the previous knock condition is read out from the RAM 61 and it is then stored in the latch 62 in response to the trigger pulse $R_1$. The outputs of the latch 62 and the selector circuit 64 are added and adjusted in value by the adder 63 and this value is rewritten into the RAM 61 as a new correction angle corresponding to the current engine operating condition (Ni, Pi). In other words, when there is knock the correction angle is given as $\theta_K - i$ (because the 2's complement of i has been preset), whereas when there is no knock the correction angle is given as $\theta_K + j$, and the advance/retard angle corresponding to the then current engine operating condition is determined for use in the next computation. The rewritten data is stored at the corresponding storage area of the RAM 61 or the storage area from which the correction value was previously read out. As a result, in accordance with this embodiment, the ignition timing determined by the ignition timing computing circuit 7 is given as the sum of the value $\theta_M$ read out from the ROM 34 under the current engine condition and the previous correction value $\theta_K$. Since the value of $\theta_K$ is associated with the value of $\theta_M$ for each engine condition, the amount of advance correction per sampling cycle can be made sufficiently small and the hunting of the ignition timing can be reduced extremely. Further, since the correction angle $\theta_K$ corresponding to each engine operating condition is determined successively in accordance with the preceding identical engine operating condition, the integrated value of the connection angle $\Delta\theta_K$ is eventually stored in the RAM 61 and the desired ignition advance is given as the sum of the values $\theta_M$ and $\Delta\theta_K$. Thus, even if a sudden change occurs in the engine condition, the equivalent response as in the case of the ordinary program control system can be ensured and the response delay peculiar to the feedback control can be eliminated. The thus determined correction value $\theta_K$ and the base value $\theta_M$ are applied to the output circuit 8. The details of the output circuit 8 are well known and will not be described. In operation, the base value $\theta_M$ and the correction value $\theta_K$ are added and the final advance angle $\theta$ given as a numeral $=180°-\theta$ is applied to the counter with a data input. On the other hand, the time for starting energization of the ignition coil is applied as a numeral $=180°-\theta-D$ (D=coil energization angle), so that in response to the reference signal T from the angular position detector 1, the values are counted down in response to the angular signals $CL\theta$ and an igniter drive pulse is generated whose negative-going transition or energization starting time and positive-going transition or ignition time correspond to the times that the values are reduced to zero as shown in (h) of FIG. 3.

Figure 6:
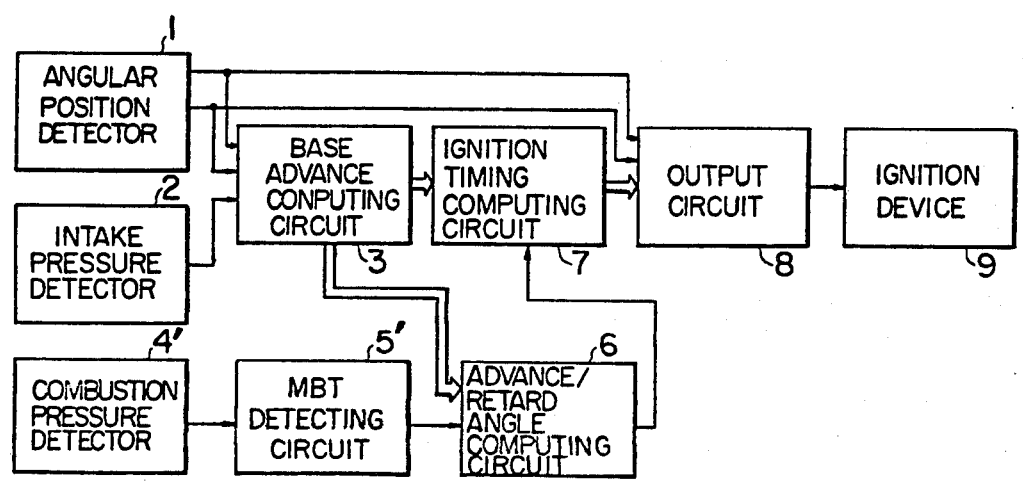
FIG. 6 is a block diagram showing a second embodiment of the system according to the invention.
Figure 7:
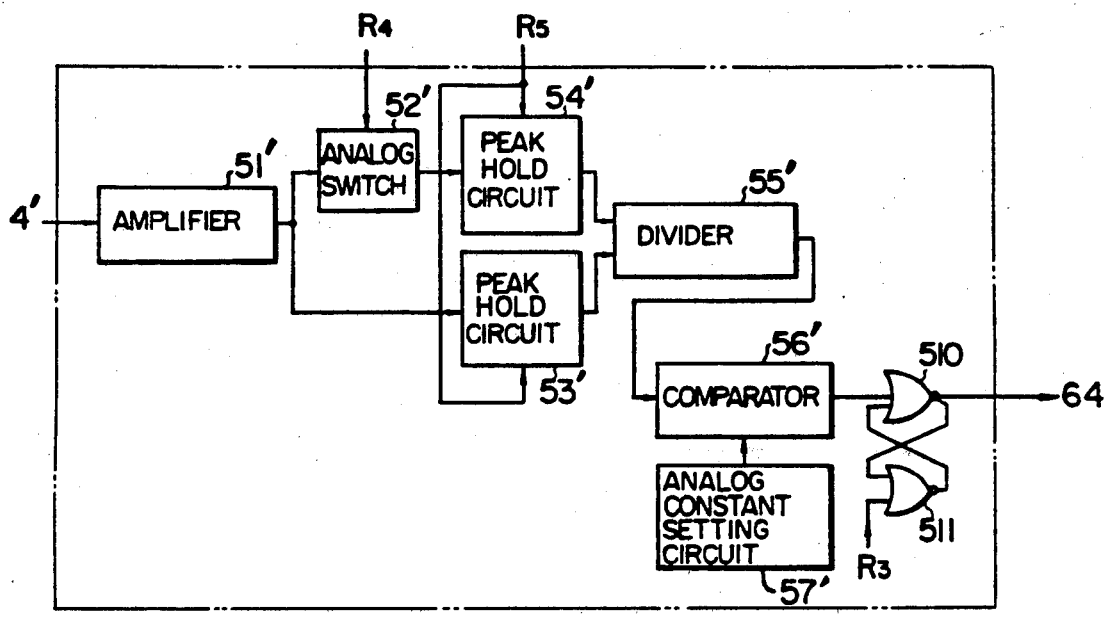
FIG. 7 is a circuit diagram showing in detail the principal component parts of the embodiment shown in FIG. 6.

Next, a second embodiment of the invention will be described which is applied to an MBT control system whereby an MBT factor such as the engine torque or combustion pressure is detected and the ignition timing is feedback controlled to the minimum advance for best torque (MBT). FIG. 6 shows a block diagram for the second embodiment and the same reference numerals as in the previously described first embodiment designate the identical component parts. Thus, the details of the second embodiment will not be described. In the Figure, numeral 1 designates an angular position detector, 2 a detector for detecting the engine intake pipe pressure, 3 a base advance computing circuit whereby an advance angle $\theta_M$ corresponding to each engine condition represented by the engine speed N and the intake pressure P is read out from the values preliminarily programmed into an ROM, 4' a pressure detector for detecting the cylinder combustion pressure (or a torque detector for detecting the engine torque), 5' an MBT detecting circuit connected to the output of the pressure detector 4' to detect whether the ignition timing is advanced or retarded with respect to MBT, 6 an advance/retard angle computing circuit connected to the MBT detecting circuit 5' and incorporating an RAM having ignition timing correction angles $\theta_K$ programmed thereinto, 7 an ignition timing computing circuit for producing the sum of the programmed advance angle $\theta_M$ and correction angle $\theta_K$ and determining the proper ignition timing $\theta$, and 8 an output circuit whereby the proper primary coil energization time and ignition timing are determined from the computed advance angle so as to actuate an ignition device 9. The blocks 1, 2, 3, 6, 7, 8 and 9 are substantially identical in construction with the counter-parts of the previously described first embodiment of the knock detecting type and will not be described in any detail. Thus, the construction of the MBT detecting circuit 5' will now be described in detail with reference to FIG. 7. Based on the experimental result that the advance angle would be controlled at substantially MBT irrespective of the engine conditions if the ignition timing is controlled so as to maintain substantially constant the maximum value for the cylinder pressure, the MBT detection control method utilizes the maximum cylinder pressure value $P_{MAX}$ and the cylinder pressure $P_m$ at a predetermined crank angle during the engine compression stroke so as to attain the desired controlled value as $P_{MAX}/P_m=a$ predetermined value. In this case, the cylinder pressure ratio is used for the purpose of eliminating as far as possible the effect of the drift or deterioration of the characteristic which is likely to occur in the pressure detector 4' and thereby improving the control accuracy. In FIG. 7, numeral 51' designates an amplifier for amplifying the cylinder pressure signal detected by the pressure detector 4', 52' in analog switch which is opened by a trigger pulse $R_4$ of a predetermined time width at a predetermined angular position before the ignition during each compression stroke (e.g., 60 degrees before TDC), 54' a peak hold circuit which is reset by a trigger pulse $R_5$ generated just before the trigger pulse $R_4$ to hold the peak value of the cylinder pressure $P_m$, 53' a peak hold circuit which is also reset by the trigger pulse $R_5$ to sample the maximum cylinder pressure value $P_{MAX}$, 55' an analog divider for producing $P_{MAX}/P_m$, and 56' a comparator for comparing the value of $P_{MAX}/P_m$ with a constant K or the predetermined voltage value generated from an analog constant setting circuit 57' so as to generate an output which goes to the "1" level when $P_{MAX}/P_m>$ the predetermined value indicating that the timing is advanced excessively resulting in an excessive pressure rise and which goes to the "0" level when the reverse is the case. Numerals 510 and 511 designate NOR circuits forming a flip-flop. These NOR circuits are identical in construction and operation with the knock detecting NOR circuits 510 and 511 shown in FIG. 2. The output of the MBT detecting circuit 5' is applied to the advance/retard angle computing circuit 6. The advance/retard angle computing circuit 6, including the construction of its RAM 61, is identical in construction and program with the counterpart of the first embodiment. The trigger pulses $R_4$ and $R_5$ can be easily provided by means of a counter which is not shown and adapted to receive the reference signal T and angular pulses $CL\theta$ from the angular position detctor 1, whereby in response for example to the negative-going transition of the reference signal T the angular pulses $CL\theta$ are counted and output signals having a pulse interval corresponding to the angular pulse $CL\theta$ are generated in response to the counting of predetermined numbers of the pulses $CL\theta$.

The operation of the second embodiment will now be described. In response to the generation of a trigger pulse $R_4$ at a predetermined position before the ignition during the first part of the compression stroke (e.g., 60 degrees before TDC), the analog switch 52' is opened for a predetermined time and the pressure value $P_m$ of the cylinder pressure detected by the pressure detector 4' is held by the peak hold circuit 54'. In the like manner, the maximum pressure $P_{MAX}$ during each combustion is held by the peak hold circuit 53'. The thus held values are applied to the divider 55' which produces $P_{MAX}/P_m$ and this $P_{MAX}/P_m$ is compared with the constant K in the comparator 56'. Thus, the comparator 56' generates a "1" level signal when $P_{MAX}/P_m>K$ and a "0" level signal is generated when the reverse is the case. When the "1" level signal is generated, the output of the flip-flop previously set by a trigger pulse $R_3$ is changed and consequently a "1" level output is generated at the output of the NOR circuit 510 until the next trigger pulse $R_3$ is generated. The following operation is the same as in the case of the previously described knock control method so that the correction value of the RAM value $\theta_K$ is modified and the ignition timing computing circuit 7 produces and applies $\theta=\theta_M+\theta_K$ to the output circuit 8. In other words, the value of $P_{MAX}/P_m$ is controlled by the same operation performed in response to the presence or absence of knock and the advance angle value $\theta$ is given as the sum of the base angle $\theta_M$ and the correction angle $\theta_K$. Each time the result of the computation is obtained, the correction value for $P_{MAX}/P_m$ corresponding to the engine condition is stored as an integrated value in the RAM. In this way, the ignition timing can be satisfactorily controlled without causing hunting but with sufficient response as mentioned previously.

In the embodiments described above, knock or MBT is detected and discriminated for every half engine revolution to modify the corresponding correction value $\theta_K$ in the RAM 61. In this way, the correction values $\theta_K$ will in effect be subjected successively to integration processing and satisfactory results will be ensured. Another method will be to detect knock at the input side through a statistical procedure (e.g., the frequency of occurrence of knock is examined). In particular, the RAM of the invention will be effective in cases where it is desired to control the ignition timing with a high degree of accuracy in accordance with the engine condition which varies with a long period (due to the spark plug fouling, the deviation of valve timing or the like).

Figure 8:
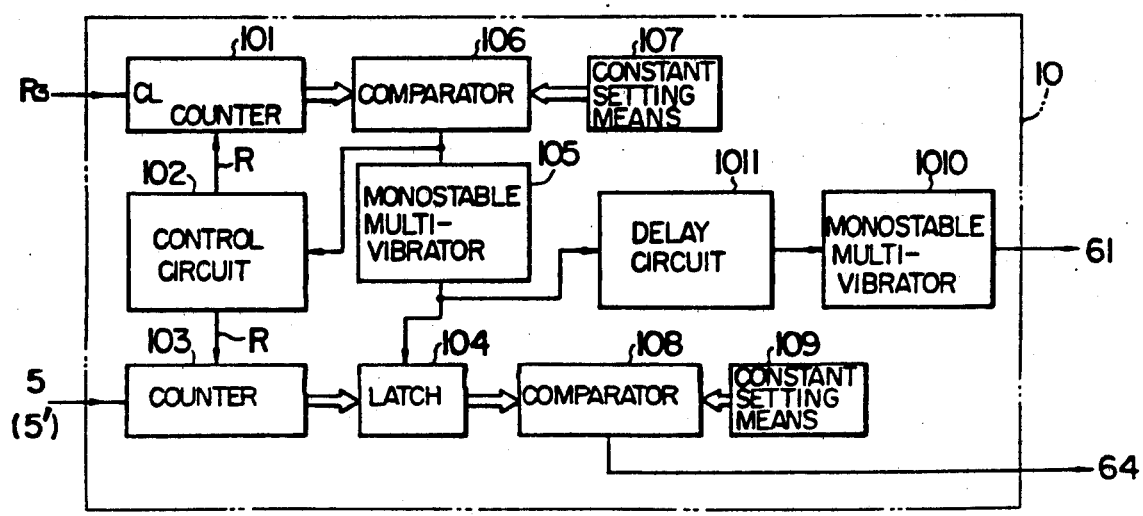
FIG. 8 is a circuit diagram showing the principal component parts of a third embodiment of the system according to the invention.

FIG. 8 shows in detail the construction of a statistical processing circuit 10 used in a third embodiment of the invention utilizing the input side processing method. This statistical processing is designed to examine the number in percent of occurrences of knock or deviation from MBT in every several tens to several hundreds cycles. Numeral 101 designates a counter for counting trigger pulses $R_3$ which are each generated every half engine revolution, 106 a digital comparator for comparing the sampling frequency n set by a constant setting means 107 with the output of the counter 101 or the number of ignition cycles so as to determine the sampling period, 105 a monostable multivibrator responsive to the output of the comparator 106 to generate a pulse signal of a desired time width, 103 a counter connected to a knock detecting circuit 5 or MBT detecting circuit 5' for counting a pulse each time knock is produced or an excessive ignition advance for MBT performance is detected, 102 a control circuit responsive to the output of the comparator 106 to reset the counters 101 and 103 after the expiration of a predetermined time, 104 a latch for temporarily storing the output of the counter 103 in response to the output of the monostable multivibrator 105, and 108 a comparator for comparing the output K' of a constant setting means 109 which sets a number of occurrences of signal with the number of occurrences of knock or MBT condition so as to generate a "1" level output when the latter is greater than the preset value K', and the output is applied to the selector input of the selector circuit 64 shown in FIG. 2 to select one or the other of the correction values i and j. Numeral 1010 designates a monostable multivibrator for generating a pulse of a predetermined time width at the expiration of a predetermined delay time after the negative-going transition of the output of the monostable multivibrator 105 which is determined by a delay circuit 1011, and the output of the monostable multivibrator 1010 is applied to the clock input of the RAM 61 of FIG. 2 in place of the trigger pulse $R_2$.

In operation, the counter 103 counts the knock or MBT signals generated from the knock detecting circuit 5 or the MBT detecting circuit 5'. On the other hand, the sampling frequency of the counter 101 is determined by the constant n and the number of pulses counted by the counter 103 during the time interval or the probability in percent of the signals generated during the time interval is determined and generated in accordance with the reference standard K'. When the sampling period is completed n time, the control circuit 102 generates a reset signal to reset the counters 101 and 103 to the initial state. In other words, in accordance with this embodiment, the number of occurrences of knock or MBT during a predetermined number of sampling periods n (the number of occurrences at the input side during many cycles) is checked so as to minimize the effect of variations in the combustion cycle and detect changes in the engine conditions accurately and thereby to change the value in the corresponding area of the RAM 61 upon completion of the sampling. In this case, since the advance angle $\theta$ is given as $\theta=\theta_M+\theta_K$, the resulting response is equivalent to that of the ordinary program control and there is no danger of hunting, thus ensuring an ideal feedback control operation. This embodiment is particularly effective in improving the accuracy of signal detection.

While, in the embodiments described above, the RAM 61 is identical in dividing point with the ROM 34, if it is worth doing from the control point of view, the dividing points of the ROM 34 may be reduced for example to ½ or ¼ of the RAM 61 or the dividing points of the ROM 34 may be made greater than those of the RAM 61, since this gives rise to no problem in operation but reduces the cost. Further, while the feedback factor, i.e., knock or MBT is detected by means of vibration or cylinder pressure, if the desired feedback factor can be detected by means of the torsional phase of shaft, torque, engine oscillation or the like, irrespective of the type of the detecting element, means and signals used, the arrangement of the invention can be used to obtain the satisfactory result and improve greatly the control quality.

Further, while, in the above-described embodiments, the desired base advance characteristic is programmed in terms of engine speeds N and intake pressures P, it is possible to use other engine parameters such as intake air amounts $G_a$ and engine speeds N and it is also possible to use a greater number of engine parameters.

It will thus be seen from the foregoing that in accordance with the invention there is a great advantage that since the desired advance angle is determined by computing the desired ordinary base ignition timing $\theta_M$ through base ignition timing setting means, computing the desired correction advance angle $\theta_K$ corresponding to the detected engine condition through a correction advance computing circuit adapted to separately rewrite the correction advance angles in accordance with the respective engine operating conditions in response to the feedback factor and then adding the correction advance angle $\theta_K$ and the base ignition timing $\theta_M$, it is possible to eliminate the greatest disadvantages of the known feedback control systems, i.e., the hunting of ignition timing and the deterioration of response and thereby to effect the feedback control so as to ensure the optimum ignition timing. More specifically, there is provided a highly accurate system in which due to the provision of the RAM values each corresponding to one of the engine operating conditions, the amount of correction per feedback control is reduced and the calculation of the correction values through integration or statistical precedure is made possible, with the result that the deterioration of detecting accuracy due to combustion variations and the resulting hunting phenomenon can be eliminated, making it possible to ensure the accurate knock-free MBT ignition timing or MBT control which has heretofore been considered to be difficult. Thus, there is a great advantage that there is no need to set the ignition timing considerably later than MBT as in the case of the known system in which the programmed values are simply translated in response to the knock and moreover the occurrence of surging as well as the deterioration of fuel consumption and torque are eliminated. Further, as regards the delay in the system's response which is peculiar to the feedback control systems, particularly in the previously described embodiments the ignition timing is determined in terms of $\theta_M + \theta_K$ (where $\theta_K$ may be the 2's complement) and consequently the computing speed is equal to that of the conventional program control ignition systems. As a result, the computing speed is equal to the program control systems and not only the control accuracy is considerably improved but also the transient response is improved considerably (however, the invention is not limited to the computation of $\theta_M + \theta_K$ and instead the computation of $\theta_M \times \theta_K$, $\theta_M/\theta_K$ or the like may be performed). Still another advantage is that the correction values can be stored in a memory circuit such as an RAM for a long period of time and that even if there occur changes in the environmental condition, changes in the engine condition or changes in the engine use condition such as deposit or fuel, the correction values $\theta_K$ in the memory circuit are automatically corrected in accordance with the respective engine operating conditions to approximate the optimum ignition timing characteristic and consequently the ignition timing of the engine is controlled to the optimum, thus ensuring the ideal combustion.

We claim:

1. An ignition timing control system of feedback type for a combustion engine comprising:
    an angular position detector to generate a plurality of angular pulses for one revolution of the engine;
    an intake pressure detector to detect an intake pressure of the engine;
    a base advance computing circuit including ROM means having ignition timing data preliminarily programmed therein responsive to said angular position detector and said intake pressure detector to determine a base advance angle of ignition timing;
    a combustion pressure detector to detect a cylinder combustion pressure of the engine;
    an MBT detecting circuit responsive to said combustion pressure detector to detect whether the ignition timing is advanced or retarded with respect to the minimum advance for best torque of the engine and provide a corresponding detection signal;
    an advance/retard angle computing circuit including RAM means having ignition timing correction data programmed therein responsive to said base advance computing circuit and said MBT detecting circuit to determine an advance/retard angle, the correction data of said RAM means being updated depending on the detection signal of said MBT detecting circuit and stored at a storage area of said RAM means corresponding respectively to the intake pressure and the revolution of the engine;
    an ignition timing computing circuit responsive to said base advance computing circuit and said advance/retard angle computing circuit to compute an advance angle from the base advance angle and the advance/retard angle; and
    an output circuit responsive to said angular position detector and said ignition timing computing circuit to provide an ignition signal to an ignition device of the engine.

2. A system according to claim 1 wherein said MBT detecting circuit includes peak hold means for holding both the maximum value of a signal from said combustion pressure detector and a pressure value corresponding to a predetermined crank angle, and compare means for comparing the ratio of said maximum value and said pressure value with a predetermined value and responsive to the comparison for producing a compare signal.

3. A system according to claim 1 wherein said RAM means includes a non-volatile memory.

4. A system according to claim 1 wherein said RAM means includes a battery backup memory.

5. A system according to claim 1 which further includes a statistical processing circuit for processing the detection signal of said MBT detecting circuit to examine the number in percent of occurrences of deviation from MBT in every predetermined cycles.

6. An ignition timing control system of feedback type for a combustion engine comprising:
    first means for detecting an operating condition of the engine;
    second means for detecting a cylinder pressure of the engine;
    an MBT detecting circuit for detecting whether the ignition timing is advanced or retarded with respect to the minimum advance for best torque of the engine, said MBT detecting circuit including peak hold means for holding both the maximum value of a signal from said second means and a pressure value corresponding to a predetermined crank angle, and means for determining whether the ignition timing is advanced or retarded, from the maximum value and the pressure value;
    computing means for computing the ignition timing, said computing means including ROM means responsive to an output signal of said first means for obtaining a base advance value of the ignition timing, RAM means for storing a correcting value which is updated depending on an output signal of said MBT detecting circuit, the correction value being stored at an area of said RAM means corresponding respectively to an intake pressure and the operating condition of the engine, means to compute the ignition timing from said base advance value and said correction value, and an output circuit responsive to said means to compute for controlling an ignition device of the engine.

7. A system according to claim 6 wherein said RAM means includes a non-volatile memory.

8. A system according to claim 6 wherein said RAM means includes a battery backup memory.

* * * * *